United States Patent
Poth et al.

(10) Patent No.: US 6,555,613 B1
(45) Date of Patent: Apr. 29, 2003

(54) POLYURETHANE AND ITS USE FOR PRODUCING SOLVENT-FREE COATING SUBSTANCES

(75) Inventors: Ulrich Poth, Münster (DE); Ulrike Röckrath, Senden (DE); Ingrid Heid, Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/936,004

(22) PCT Filed: Mar. 3, 2000

(86) PCT No.: PCT/EP00/01841

§ 371 (c)(1),
(2), (4) Date: Sep. 7, 2001

(87) PCT Pub. No.: WO00/53651

PCT Pub. Date: Sep. 14, 2000

(30) Foreign Application Priority Data

Mar. 10, 1999 (DE) .......................................... 199 10 492

(51) Int. Cl.$^7$ .............................. C08J 3/00; C08K 3/20; C08L 75/00; B05D 1/02; B05D 3/02

(52) U.S. Cl. ................ 524/589; 427/372.2; 427/385.5; 524/590; 524/591; 524/839; 524/840

(58) Field of Search ................................. 524/589, 591, 524/839, 840, 590; 427/372.2, 385.5

(56) References Cited

U.S. PATENT DOCUMENTS

| | | | |
|---|---|---|---|
| 4,322,325 A | 3/1982 | Esser et al. | 523/457 |
| 4,489,135 A | 12/1984 | Drexler et al. | 428/423.1 |
| 4,558,090 A | 12/1985 | Drexler et al. | 524/591 |
| 4,594,374 A | 6/1986 | Stahl et al. | 523/501 |
| 4,608,413 A | 8/1986 | Nachtkamps et al. | 524/591 |
| 4,719,132 A | 1/1988 | Porter, Jr. | 427/409 |
| 4,730,020 A | 3/1988 | Wilfinger et al. | 524/555 |
| 4,851,460 A | 7/1989 | Stranghöner et al. | 523/407 |
| 4,914,148 A | 4/1990 | Hille et al. | 524/507 |
| 5,028,639 A | 7/1991 | Treutlein et al. | 523/200 |
| 5,210,154 A | 5/1993 | Weidemeier et al. | 525/438 |
| 5,294,665 A | 3/1994 | Pedain et al. | 524/591 |
| 5,326,820 A | 7/1994 | Hoffmann et al. | 525/123 |
| 5,512,322 A | 4/1996 | Hille et al. | 427/407.1 |
| 5,589,228 A | 12/1996 | Wegner et al. | 427/407.1 |

FOREIGN PATENT DOCUMENTS

| | | | |
|---|---|---|---|
| CA | 1089140 | 11/1904 | D06M/15/52 |
| DE | 26 24 442 A1 | 12/1976 | C08L/75/04 |
| DE | 29 26 584 A1 | 1/1981 | C09D/3/64 |
| DE | 32 10 051 A1 | 9/1983 | C09D/3/72 |
| DE | 33 21 180 A1 | 12/1984 | C09D/3/66 |
| DE | 35 45 618 A1 | 6/1987 | C09D/3/72 |
| DE | 36 28 124 A1 | 3/1988 | C09D/3/727 |
| DE | 36 36 183 A1 | 3/1988 | C09D/5/38 |
| DE | 37 39 332 A1 | 6/1989 | B05D/7/24 |
| DE | 38 13 866 A1 | 11/1989 | C09D/3/72 |
| DE | 40 05 961 A1 | 8/1991 | B05D/7/16 |
| DE | 40 24 204 A1 | 2/1992 | C09D/175/04 |
| DE | 198 22 631 A1 | 11/1999 | C09D/175/04 |
| EP | 0 008 127 A1 | 8/1979 | E21F/17/00 |
| EP | 0 089 497 A2 | 2/1983 | C09D/3/72 |
| EP | 0 158 099 A2 | 3/1985 | C09D/5/38 |
| EP | 0 195 931 A1 | 2/1986 | C09D/3/80 |
| EP | 0 249 201 A2 | 6/1987 | C09D/3/58 |
| EP | 0 276 501 A2 | 9/1987 | C11D/1/42 |
| EP | 0 355 433 A2 | 7/1989 | C08G/18/08 |
| EP | WO 94/22968 | 10/1994 | C09D/133/06 |
| EP | WO 97/12945 | 4/1997 | C09D/5/04 |
| EP | WO 97/49745 | 12/1997 | C08G/18/08 |
| EP | WO 97/49747 | 12/1997 | C08G/18/75 |

OTHER PUBLICATIONS

English Language Abstract provided for DE 198 22 631 A1.
English Language Abstract provided for DE 37 39 332 A1.
English Language Abstract provided for DE 33 21 180 A1.
English Language Abstract provided for EP 0 008 127 A1.
English Language Abstract for WO94/22968 is provided with the International Publication.

Primary Examiner—Patrick D. Niland

(57) ABSTRACT

A reactive polyurethane with a number average molecular weight Mn of 800 to 14,000 daltons, a branching degree of 0.0 to 3.0 Mol/kg and an isocyanate functionality of 2.0 to 6.0. The reactive polyurethane is produced by reacting polyester and/or polyether, which both have at least two functional groups that are reactive with isocyanate and which have a molecular weight of 400 to 2,500 daltons and a branching degree of 0 to 3.5 Mol/kg; with at least one polyol with a molecular weight of 62 to 400 daltons and a functionality of 2 to 4; polyamines and/or alkanolamines; compounds with at least one functional group capable of producing anions and at least one functional group that is reactive with isocyanates; polyisocyanates and/or polyisocyanate adducts; blocking agents for the isocyanate groups and neutralizer. Also, a polyurethane dispersion containing the reactive polyurethanes.

26 Claims, No Drawings

POLYURETHANE AND ITS USE FOR PRODUCING SOLVENT-FREE COATING SUBSTANCES

The present invention relates to a novel reactive polyurethane and a novel polyurethane dispersion and to the use thereof for preparing solvent-free coating materials, especially basecoat and/or clearcoat or solid-color topcoat materials. The present invention further relates to a novel solvent-free coating material which comprises the novel polyurethane and the novel polyurethane dispersion. The present invention additionally relates to a novel process for producing multicoat coating systems on primed or unprimed substrates. The present invention relates not least to novel single-coat or multicoat coating systems, especially automotive OEM finishes, industrial coatings, including coil coatings and container coatings, and furniture coatings, and also to substrates which have these novel coatings.

In the context of the present invention, the term "solvent-free" denotes that the coating material in question is completely free from organic solvents or contains only the small amounts of organic solvents normally introduced by way of the starting products.

It is a general object to provide, for industrial processing, coating materials which release a minimum of volatile organic substances on processing.

Known are:
1. Solvent-free coating materials based on primary polymer dispersions, but which give rise to diffusion-impervious, stable, glossy coatings only in combination with dissolved cobinders and cosolvents.
2. Coating materials based on secondary dispersions, especially polyacrylate, polyester or polyurethane dispersions, but which again only give impervious, stable, glossy coatings with fractions of cosolvents and which, moreover, tend toward popping during application and film forming.
3. Solvent-free coating systems in the form of powder coatings or powder coating slurries, which are able to form impervious, smooth, glossy coatings, but whose preparation requires considerable effort and whose application, especially in the case of powder coating materials, requires special equipment.

It is an object of the present invention to provide a novel solvent-free coating material which no longer has the disadvantages of the prior art but instead may be processed and applied by the conventional application methods with substantially no emission of volatile organic substances and which after curing gives impervious, stable, glossy coatings.

The invention accordingly provides the novel reactive polyurethane (1) having a number-average molecular weight Mn of from 800 to 14000 daltons, a degree of branching of from 0.0 to 3.0 mol/kg, and an isocyanate functionality of from 2.0 to 6.0, which is preparable by reacting with one another (1.1) at least one polyester and/or
(1.2) at least one polyether, both of which have at least two isocyanate-reactive functional groups, a molecular mass of from 400 to 2500 daltons and a degree of branching of from 0 to 3.5 mol/kg;
(1.3) at least one polyol having a molecular mass of from 62 to 400 daltons and a functionality of from 2 to 4 and/or
(1.4) at least one polyamine and/or
(1.5) at least one alkanolamine;
(1.6) at least one compound having at least one functional group capable of forming anions and at least one, in particular at least two, isocyanate-reactive functional groups;
(1.7) at least one polyisocyanate and/or
(1.8) at least one polyisocyanate adduct;
(1.9) at least one blocking agent for the isocyanate groups, which are eliminated again at a certain reaction temperature from the isocyanate groups they block, or are released again by a substitution reaction in the presence of the crosslinking agent (2); and
(1.10) at least one neutralizing agent for the anionic stabilization in the aqueous medium, which comprises or consists of organic and/or inorganic bases.

In the text below, the novel reactive polyurethane is referred to as the "polyurethane of the invention".

The invention also provides the novel polyurethane dispersion which comprises at least one polyurethane of the invention in dispersion in an aqueous medium.

In the text below, the novel polyurethane dispersion is referred to as the "polyurethane dispersion of the invention".

The invention further provides the novel solvent-free coating material, especially basecoat and/or clearcoat or solid-color topcoat material, which comprises at least one polyurethane of the invention and/or one polyurethane dispersion of the invention.

In the text below, the novel solvent-free coating material is referred to as the "coating material of the invention".

The invention additionally provides a novel process for producing single-coat and multicoat coating systems, in which the coating material of the invention is used.

In the text below, the novel process for producing single-coat and multicoat systems is referred to as the "process of the invention".

The invention provides, moreover, novel single-coat and multicoat systems produced using the coating material of the invention and/or with the aid of the process of the invention.

In the text below, the novel single-coat and multicoat systems are referred to as the "coating systems of the invention".

The invention provides not least novel primed or unprimed substrates which carry the coating systems of the invention and which are referred to below as "substrates of the invention".

In the light of the prior art it was surprising and unforeseeable for the skilled worker that the object on which the present invention is based might be achieved with the aid of the polyurethane of the invention or, respectively, the polyurethane dispersion of the invention, especially since the polyurethane dispersions known from the prior art still always necessarily include a comparatively high solvent fraction in order for their profile of properties to meet all of the requirements.

The polyurethane of the invention has a number-average molecular weight Mn of from 800 to 14000 daltons, preferably from 1500 to 6000 daltons. It has a degree of branching of from 0.0 to 3.0 mol/kg, preferably from 0.1 to 1.0 mol/kg. Its functionality, based on the blocked isocyanate groups, is from 2.0 to 6.0, preferably from 2.5 to 4.0 per mol.

The polyurethane of the invention is preparable from the starting products (1.1) to (1.10).

In accordance with the invention, at least one polyester is used as starting product (1.1) and at least one polyether is used as starting product (1.2). The starting products (1.1) and (1.2) may each be used individually or as a mixture to prepare the polyurethane of the invention. In accordance with the invention, the polyesters (1.1) are of advantage and are therefore used with preference.

The starting products (1.1) and (1.2) contain at least two isocyanate-reactive functional groups. Examples of suitable such functional groups are thio, amino, hydroxyl, or epoxide groups. In accordance with the invention, hydroxyl groups are advantageous and are therefore used with preference.

The polyesters (1.1) and polyethers (1.2) have molecular masses of from 400 to 2500 daltons, preferably from 800 to 1800 daltons, and a degree of branching of from 0 to 3.5 mol/kg.

The polyesters (1.1) for use in accordance with the invention are obtainable by reacting polycarboxylic acids, polyols and, if desired, monocarboxylic acids.

Examples of suitable polycarboxylic acids are aromatic polycarboxylic acids such as terephthalic acid, isophthalic acid, phthalic acid, trimellitic acid or pyromellitic acid and also their ring-substituted alkyl derivatives; cycloaliphatic polycarboxylic acids such as tetrahydrophthalic acid, 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid or tricyclodecanedicarboxylic acid, which may be used both in their cis forms and in their trans forms and also as a mixture of both forms; or acyclic polycarboxylic acids such as malonic acid, succinic acid, glutaric acid, adipic acid, pimelic acid, suberic acid, azelaic acid, sebacic acid, undecanedicarboxylic acid or dodecanedicarboxylic acid, maleic acid, fumaric acid, itaconic acid, citraconic acid or dimer fatty acids.

Also suitable in accordance with the invention are the esterifiable derivatives of the abovementioned polycarboxylic acids, such as, for example, their monoesters or polyesters with aliphatic alcohols having 1 to 4 carbon atoms or hydroxy alcohols having 1 to 4 carbon atoms. Furthermore, it is also possible to use the anhydrides of the abovementioned polycarboxylic acids, where they exist.

Examples of suitable polyols are diols such as ethylene glycol, 1,2- or 1,3-propanediol, methylpropane-1,3 diol, ether oligomers of ethylene glycol and propylene glycol such as diethylene glycol or dipropylene glycol, 1,2-, 1,3- or 1,4-butanediol, 1,2-, 1,3-, 1,4- or 1,5 pentanediol, 1,2-, 1,3-, 1,4-, 1,5- or 1,6-hexanediol, neopentyl hydroxypivalate, neopentyl glycol, 1,2-, 1,3 or 1,4-cyclohexanediol, 1,2-, 1,3- or 1,4-cyclohexanedimethanol, tricyclodecanedimethanol (TCD), trimethylpentanediol, ethylbutylpropanediol, octanediols, nonanediols, the positionally isomeric diethyloctanediols, 2-butyl-2-ethylpropane-1,3-diol, 2-butyl-2-methylpropane-1,3-diol, 2-phenyl-2-methylpropane-1,3-diol, 2-propyl-2-ethylpropane-1,3-diol, 2-di-tertbutylpropane-1,3-diol, 2-butyl-2-propylpropane-1,3-diol, 1-dihydroxymethylbicyclo[2.2.1]heptane, 2,2-diethylpropane-1,3-diol, 2,2-dipropylpropane-1,3-diol, 2-cyclohexyl-2-methylpropane-1,3-diol, 2,5-dimethylhexane-2,5-diol, 2,5-diethylhexane-2,5-diol, 2-ethyl-5-methylhexane-2,5-diol, 2,4-dimethylpentane-2,4-diol, 2,3-dimethylbutane-2,3-diol, 1,4-di(2'-hydroxypropyl)benzene, 1,3-di(2'-hydroxypropyl)benzene or dimer diols from dimer fatty acids; or triols such as glycerol, trimethylolethane, trimethylolpropane, trishydroxyethyl isocyanurate or pentaerythritol.

The diols and the triols are employed in a molar ratio which gives the desired degree of branching.

Examples of suitable monocarboxylic acids, employed if desired, are 2-ethylhexanoic acid, 3,3,5-trimethylexanoic acid, pelargonic acid, fatty acids from coconut oil, fatty acids from natural oils, resin acids, benzoic acid, and p-tert-butylbenzoic acid.

The polyester (1.1) is prepared by the known methods of esterification, as described for example in DE-A-40 24 204, page 4 lines 50 to 65. The reaction usually takes place at temperatures of between 180 and 280° C., in the presence or absence of an appropriate esterification catalyst, such as lithium octoate, dibutyltin oxide, dibutyltin dilaurate or para-toluenesulfonic acid, for example.

The polyester (1.1) is normally prepared in the presence of small amounts of an appropriate solvent as entrainer. Examples of entrainers used are aromatic hydrocarbons, such as in particular xylene and (cyclo)aliphatic hydrocarbons, e.g., cyclohexane or methylcyclohexane.

Examples of suitable polyethers (1.2) for use in accordance with the invention are adducts of polyols, especially those described in detail above, and ethylene oxide or propylene oxide or mixtures of the two in the form of random or block copolymers.

In accordance with the invention, further starting products used comprise at least one polyol (1.3) having a molecular mass of from 62 to 400 daltons and a functionality of from 2 to 4 and/or at least one polyamine (1.4) and/or at least one alkanolamine (1.5) for the preparation of the polyurethane of the invention.

Examples of suitable polyols (1.3) are the polyols described in detail above.

Examples of suitable polyamines (1.4) are, e.g., hydrazine, ethylenediamine, propylenediamine, methyldiaminopropane, higher alkanediamines, diethylenetriamine, dipropylenetriamine, m-xylylenediamine, p-xylylenediamine, 4,4'-diaminodicyclohexane, 4,4'-diamino-3,3'-dimethylcyclohexane or isomeric octanediamines.

Examples of suitable alkanolamines (1.5) are, e.g. ethanolamine, methylethanolamine, diisopropylamine, diethanolamine, N-methyldiethanolamine, hydroxyethoxyethylamine, polyetheramine-ols, aminomethylpropanol, trishydroxymethylaminomethane or triethanolamine.

In accordance with the invention, a further starting product used comprises at least one compound (1.6) having at least one functional group capable of forming anions and at least one, in particular at least two, isocyanate-reactive functional group(s) for the preparation of the polyurethane of the invention.

Examples of suitable functional groups capable of forming anions are carboxylic acid, sulfonic acid and phosphonic acid groups, of which the carboxylic acid groups are particularly advantageous and are therefore used with preference in accordance with the invention.

Examples of suitable isocyanate-reactive functional groups are those described above, of which the hydroxyl groups are of advantage in accordance with the invention and are therefore employed with preference.

Examples of compounds (1.6) used with preference are dimethylolpropionic acid, hydroxypivalic acid, the reaction product of ethylenediamine and acrylic acid, the reaction product of a diol diester of maleic acid and sulfurous acid, or the alkali metal salts thereof.

In accordance with the invention, further starting products used to prepare the polyurethane of the invention comprise at least one polyisocyanate (1.7) and/or at least one polyisocyanate adduct (1.8).

Suitable polyisocyanates (1.7) in principle are all of the customary and known polyisocyanates used in the coatings field, which are also referred to as paint polyisocyanates.

Examples of suitable polyisocyanates (1.7) are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, dicyclohexylmethane 4,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, or diisocyanates derived from dimer fatty acids, as sold under the commercial designation DDI 1410 by the company Henkel and described in the patents WO 97/49745 and WO 97/49747, especially 2-heptyl-3,4-bis(9-isocyanatononyl)-1-pentylcyclohexane, 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, m-tetramethylxylylene diisocyanate (i.e., 1,3-bis(2-isocyanatoprop-2-yl)benzene), or tolylene diisocyanate.

Examples of suitable polyisocyanate adducts (1.8) are isocyanato-containing polyurethane prepolymers, which may be prepared by reacting polyols with an excess of polyisocyanates and which are of preferably low viscosity. It is also possible to use polyisocyanates containing isocyanurate, biuret, allophanate, iminooxadiazinedione, urethane, urea, carbodiimide and/or uretdione groups. Polyisocyanates containing urethane groups, for example, are obtained by reacting some of the isocyanate groups with polyols, such as trimethylolpropane and glycerol, for example. It is preferred to use the polyisocyanates (1.7) described in detail above.

Very particular preference is given to using mixtures of polyisocyanate adducts (1.8) based on hexamethylene diisocyanate and containing uretdione and/or isocyanurate groups and/or allophanate groups, as formed by catalytic oligomerization of hexamethylene diisocyanate using appropriate catalysts. Moreover, the polyisocyanate constituent may also consist of any desired mixtures of the free polyisocyanates (1.7) mentioned by way of example.

In accordance with the invention, at least one blocking agent (1.9) is used to prepare the polyurethane of the invention. As is known, these blocking agents are eliminated again at a certain reaction temperature from the isocyanate groups they block, or are released again by way of a substitution reaction in the presence of the crosslinking agent (2) described below.

Examples of suitable blocking agents (1.9) are
i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;
ii) lactams, such as ε-caprolactam, δ-valerolactam, γ-butyrolactam or β-propiolactam;
iii) active methylenic compounds, such as diethyl malonate, dimethyl malonate, ethyl or methyl acetoacetate, or acetylacetone;
iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid or lactic esters;
v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;
vi) acid amides such as acetoanilide, acetoanisidinamide, acrylamide, methacrylamide, acetamide, stearamide or benzamide;
vii) imides such as succinimide, phthalimide or maleimide;
viii) amines such as diphenylamine, phenylnaphthylamine, xylidine, N-phenylxylidine, carbazole, aniline, naphthylamine, butylamine, dibutylamine or butylphenylamine;
ix) imidazoles such as imidazole or 2-ethylimidazole;
x) ureas such as urea, thiourea, ethyleneurea, ethylenethiourea or 1,3-diphenylurea;
xi) carbamates such as phenyl N-phenylcarbamate or 2-oxazolidone;
xii) imines such as ethyleneimine;
xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;
xiv) salts of sulfurous acid such as sodium bisulfite or potassium bisulfite;
xv) hydroxamic esters such as benzyl methacrylohydroxamate (BMH) or allyl methacrylohydroxamate; or
xvi) substituted pyrazoles, ketoximes, imidazoles or triazoles; and also
xvii) mixtures of these blocking agents, especially dimethylpyrazole and triazoles, malonic esters and acetoacetic esters or dimethylpyrazole and succinimide.

In accordance with the invention, neutralizing agents (1.10) are used to prepare the polyurethanes of the invention.

The neutralizing agents (1.10) comprise organic and/or inorganic, especially organic, bases, or consist thereof.

Examples of suitable inorganic bases are alkali metal hydroxides, ammonia or salts which release ammonia; examples of suitable organic bases are amines, preferably tertiary amines such as triethylamine, N,N-dimethylethanolamine, and triethanolamine.

Particularly advantageous polyurethanes of the invention result from the reaction of polyesters (1.1) which have been formed from cycloaliphatic and aliphatic polycarboxylic acids with cycloaliphatic or aliphatic diisocyanates (1.7), triols (1.3) and ketoximes, dimethylpyrazole, acetoacetates and malonic esters, and/or mixtures thereof, as blocking agents The nature and amount of the starting products described in detail above are selected so as to give a polyurethane of the invention having the above-defined specification.

In accordance with the invention, the blocking agent (1.9) is used here in a molar ratio of from 0.9 to 1.3, based on the isocyanate groups which are not reactable or reacted with the other starting products, and the neutralizing agent (1.10) is used in a molar ratio of from 0.5 to 1.2, based on the functional groups of the compounds (1.6) that are capable of forming anions.

Otherwise, the skilled worker is able to make the election on the basis of his or her general knowledge in the art, possibly with the assistance of simple preliminary tests.

The polyurethanes (1) of the invention are prepared by conventional processes. By way of example, reference may be made to the patents EP-A-0 355 433, DE-A-35 45 618, DE-A-38 13 866, DE-A-32 10 051, DE-A-26 24 442, DE-A-37 39 332, U.S. Pat. No. 4,719,132, EP-A-0 089 497, U.S. Pat. No. 4,558,090, U.S. Pat. No. 4,489,135, DE-A-36 28 124, EP-A-0 158 099, DE-A-29 26 584, EP-A-0 195 931, DE-A-33 21 180 and DE-A-40 05 961.

Accordingly, the starting products—polyesters (1.1) and/or polyethers (1.2), polyols (1.3), polyamines (1.4) and/or alkanolamines (1.5), compounds (1.6), polyisocyanates (1.7) and/or polyisocyanate adducts (1.8)—are reacted in the presence or absence of a solvent, which is of comparatively high volatility, is soluble in water and is unable to react with the isocyanates, and also in the presence, if desired, of effective amounts of catalysts, at temperatures of from 50 to 120° C. Examples of suitable solvents are lower ketones such as acetone, methyl ethyl ketone or methyl isobutyl ketone. Examples of suitable catalysts are tin salts. The result is a polyurethane prepolymer, branched if desired, containing terminal free isocyanate groups.

The prepolymer may also be synthesized in stages. The reaction is monitored by determining the NCO equivalent weight and, if appropriate, measuring the viscosity of a defined measurement solution.

Subsequently, the remaining free isocyanate groups are reacted with the blocking agent (1.9) at temperatures from 50 to 120° C. Certain blocking agents (1.9) necessitate the use of catalysts, such as alkali metal phenoxide, for example, in the case of acetoacetate and malonic esters. The conversion is monitored by determining the NCO equivalent weight, and the reaction is normally carried out until the concentration of the isocyanate groups has fallen below the detection limit. The result is a polyurethane, branched if desired, containing a certain amount of reactive capped isocyanate groups and functional groups, capable of forming anions, from the incorporated compounds (1.6). These functional groups of the polyurethane in the abovementioned process solvent are then neutralized with a defined amount of a neutralizing agent (1.10), so giving the polyurethane of the invention.

The polyurethane of the invention is then dispersed in an aqueous medium, so giving the polyurethane dispersion of the invention.

The aqueous medium substantially comprises, or consists of, water. In this context, the aqueous medium may contain minor amounts of the above-described neutralizing agents (1.10), the crosslinking agents (2) and/or coatings additives (3) described above, and/or other dissolved solid, liquid or gaseous, organic and/or inorganic, low and/or high molecular mass substances. In the context of the present invention, the term "minor amount" means an amount which does not destroy the aqueous character of the aqueous medium. Preferably, water alone is used.

The solvent and any excess of blocking agent (1.9) are removed from the polyurethane dispersion of the invention down to below their detection limits by vacuum distillation at temperatures from 50 to 110° C. This gives a solvent-free polyurethane dispersion of the invention with anionic stabilization.

One variant of the above-described process for preparing the polyurethane of the invention and the polyurethane dispersion process of the invention comprises allowing the polyisocyanates (1.7) and/or polyisocyanate adducts (1.8) first to undergo partial initial reaction with the blocking agent (1.9) and only then reacting them with the other starting products.

The coating materials of the invention comprise at least one crosslinking agent (2) having functional groups which are able to undergo crosslinking reactions with the blocked isocyanate groups of the polyurethanes of the invention at relatively high temperatures, in particular temperatures above 80° C.

Another process variant comprises conducting the reaction of the polyurethane prepolymer with the blocking agent until a comparatively low NCO equivalent weight is reached and then reacting the remaining isocyanate groups with the polyols (1.3), polyamines (1.4) and/or alkanolamines (1.5) for the further synthesis of the molecule.

In the case of yet another process variant, this molecular synthesis with polyamines (1.4) and/or alkanolamines (1.5) takes place only after the neutralization, or together with the neutralization, in the aqueous medium.

Another particular process variant comprises allowing the polyurethane prepolymer, still containing free isocyanate groups and capped isocyanate groups, to react with water in the aqueous medium during the neutralization; in this case, part of the product formed from the isocyanate groups comprises amino groups, which react with other isocyanate groups to give urea groups, a reaction accompanied by chain extension.

The polyurethane of the invention and the polyurethane dispersion of the invention are used to prepare the coating materials of the invention, especially the clearcoat or topcoat materials of the invention.

The coating materials of the invention comprise at least one crosslinking agent (2) having functional groups which are able to undergo crosslinking reactions with the blocked isocyanate groups of the polyurethanes of the invention at relatively high temperatures, in particular temperatures above 800C [sic].

Examples of suitable crosslinking agents (2) are polyols (2.1), polyamines (2.2) and/or alkanolamines (2.3), especially those which are not markedly volatile at room temperature and are also water-soluble or are water-dilutable in conjunction with the polyurethane of the invention.

Examples of suitable polyols (2.1) are the polyols described above, provided they meet the abovementioned conditions, especially ethylene glycol, propylene glycol, ether oligomers of ethylene glycol and propylene glycol, propane-1,3-diol, butane-1,4-diol, butane-1,3-diol, methylpropane-1,3-diol, pentane-1,5-diol, methylbutane-1,4-diol, neopentyl glycol, hexane-1,6-diol, glycerol, trimethylolethane, trimethylolpropane or trishydroxyethyl isocyanurate, especially trishydroxyethyl isocyanurate.

Examples of suitable polyamines (2.2) are ethylenediamine, propylenediamine, methyldiaminopropane, diethylenetriamine, dipropylenetriamine, m-xylylenediamine, p-xylylenediamine, 4,4'-diaminodicyclohexane or 4,4'-diamino-3,3'-dimethylcyclohexane.

Examples of suitable alkanolamines (2.3) are ethanolamine, methylethanolamine, diisopropylamine, diethanolamine, N-methyldiethanolamine, hydroxyethoxyethylamine, polyetheramine-ols, aminomethylpropanol, trishydroxymethylaminomethane or triethanolamine.

Advantageously, the polyol (2.1), the polyamine (2.2) and/or the alkanolamine (2.3) is or are used in an amount such that the ratio of (i) equivalent weight of the polyurethane of the invention, based on the blocked isocyanate groups present therein, to (ii) equivalent weight of the crosslinking agent (2) is from 0.6 to 1.3.

The coating material of the invention may comprise customary coatings additives (3) in effective amounts. The nature and amount of the additives (3) are guided in particular by the intended use of the coating material of the invention. A critical factor is that these additives (3) should be nonvolatile under the processing and application conditions of the coating material of the invention, so that only organic constituents which are volatile on thermal curing (baking), such as the neutralizing agents (1.10), blocking agents (1.9), additives (3) or degradation products, are released.

Where the coating material of the invention is used as a basecoat or solid-color topcoat material, it comprises color and/or effect pigments (3.1) in customary and known amounts. The pigments (3.1) may consist of organic or inorganic compounds and may impart effect and/or color. On the basis of this large number of suitable pigments, therefore, the coating material of the invention ensures a universal scope of use of the coating materials and permits the realization of a large number of shades and optical effects.

As effect pigments (3.1) it is possible to use metal flake pigments such as commercially customary aluminum bronzes, aluminum bronzes chromated in accordance with DE-A-36 36 183, and commercially customary stainless steel bronzes, and also nonmetallic effect pigments, such as pearlescent pigments and interference pigments, for example. Use is made in particular of those effect pigments (3.1) which are stable in aqueous media. Examples of suitable inorganic color pigments (3.1) are titanium dioxide, iron oxides, Sicotrans yellow, and carbon black. Examples of suitable organic color pigments are indanthrene blue, Cromophthal red, Irgazine orange and Heliogen green.

The coating material of the invention may further comprise organic and inorganic fillers (3.1) in customary and known, effective amounts. Examples of suitable fillers are chalk, calcium sulfate, barium sulfate, silicates such as talc or kaolin, silicas, oxides such as aluminum hydroxide or magnesium hydroxide, nanoparticles, or organic fillers such as textile fibers, cellulose fibers, polyethylene fibers or wood flour.

These additives (3.1) are omitted if the coating materials of the invention are used as clearcoat materials.

Examples of suitable additives (3) which may be present in both the clearcoat materials and topcoat materials of the invention are UV absorbers (3.2);

free-radical scavengers (3.3);

crosslinking catalysts (3.4);

slip additives (3.5);

polymerization inhibitors (3.6);

defoamers (3.7);

emulsifiers (3.8), especially nonionic emulsifiers such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents (3.9) such as siloxanes, fluorine compounds, carboxylic monoesters, phosphoric esters, polyacrylic acids and their copolymers, or polyurethanes;

adhesion promoters (3.10);

leveling agents (3.11);

film-forming auxiliaries (3.11) such as cellulose derivatives;

flame retardants or rheology control additives (3.12) such as those known from the patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates.

Further examples of suitable additives (3) are described in the textbook "Lackadditive" [Additives for coatings] by Johan Bieleman, Wiley-VCH, Weinheim, New York, 1998.

Viewed in terms of its method, the preparation of the coating composition of the invention has no special features but instead takes place in a customary and known manner by mixing of its constituents in customary and known mixing equipment such as dissolvers. In this context, the crosslinking agent (2) may be added per se or in solution in water to the polyurethane dispersion of the invention. Then the additives (3) are added. Thereafter, the viscosity is adjusted with water to the desired processing viscosity. Alternatively, the additives (3) may be added to the organic phase following the preparation of the polyurethane of the invention, after which they are converted into the polyurethane dispersion of the invention together with the polyurethane of the invention. Alternatively, the crosslinking agent (2) may be mixed in organic phase with the polyurethane of the invention; the resulting organic solution is then dispersed in an aqueous medium and the organic solvent is stripped off or distilled off, under reduced pressure if desired.

For processing and application, the solids content of the coating materials of the invention may be varied widely. In accordance with the invention, however, it is of advantage if the coating materials of the invention have a solids content of from 25 to 55% by weight, preferably from 30 to 45% by weight.

The coating material of the invention may be applied by customary application methods, such as spraying, knife coating, brushing, flow coating, dipping or rolling, for example, to any desired, primed or unprimed substrates such as metal, wood, plastic, glass or paper, especially metal. In the case of plastics, the customary and known water-based primers may be employed. In the case of metals, it is common to use primers produced from cathodic electrodeposition coating materials and primer-surfacers.

The coating materials of the invention are outstandingly suitable for the production of single-coat or multicoat coating systems, especially automotive OEM finishes, industrial coatings, including coil coatings and container coatings, and furniture coatings. In all end uses, they may be used as basecoat materials and/or clearcoat materials or solid-color topcoat materials. With particular advantage they are used for the OEM finishing of automobiles.

For the production of the single-coat and multicoat coating systems of the invention, the coating materials of the invention, following their application, are cured thermally at relatively high temperatures. It is advantageous in this case to employ temperatures of from 80° to 180°, preferably from 100 to 170, and in particular from 120 to 160° C. The duration of curing may vary widely and depending on the coating material of the invention may be from one minute up to several hours. For the thermal curing it is possible to employ the customary and known equipment such as forced-air ovens or IR lamps.

The coating material of the invention is of outstanding suitability in particular for the production of multicoat coating systems of the invention by the process of the invention.

The process of the invention starts in step (I) from the application of a basecoat material to the substrate surface or to the primer. The resulting basecoat film is not cured but merely dried. In step (II) of the process, the clearcoat material is applied wet-on-wet, followed by curing of the resulting basecoat/clearcoat film in step (III) of the process. In accordance with the invention, the basecoat material and/or the clearcoat material comprise(s) a coating material of the invention. If the basecoat material or clearcoat material used is not a coating material of the invention, customary and known aqueous basecoat materials, or customary and known clearcoat materials, are used instead.

The result is continuous, substantially diffusion-impervious, hard, glossy, elastic, single-coat or multicoat coating systems of the invention, without defects such as popping marks, streaks or cloudiness (haze), which are notable, furthermore, for particularly high chemical resistance and weathering stability.

EXAMPLES

Preparation Example 1

Preparation of the Polyurethane Dispersion of the Invention

A 4 l useful capacity, stainless steel reactor with a close-clearance stirrer, a reflux condenser, regulatable oil heating and temperature measurement for the reaction mixture was charged with 1447 g of a 75% strength solution in methyl ethyl ketone of a saturated polyester (1.1) prepared from hexahydrophthalic anhydride, neopentyl glycol and hexane-1,6-diol and having an average molecular mass of 1085 daltons, an number of 93.4 and an acid number of 10, 40.2 g of trimethylolpropane, 227.8 g of dimethylolpropionic acid, 954.6 g of isophorone diisocyanate and 711.3 g of methyl ethyl ketone. The reaction mixture was carefully heated to 82° C., thereby establishing reflux. The reaction mixture was held at from 80 to 82° C. until the NCO equivalent weight, based on the solution, reached 1350. It was then cooled to 50° C. and 200.1 g of methyl ethyl ketoxime were added. The reaction mixture was heated at 70° C. until the NCO equivalent weight, based on the solution, had risen to more than 25000. Then the reaction mixture, in 3000 g of deionized water which had been heated to 50° C., was mixed with 121 g of N,N-dimethylethanolamine, after which the mixture was dispersed.

The resulting polyurethane dispersion was introduced into a reactor equipped with a condenser and receiver for a vacuum distillation, and was heated to 60° C. From the start a reduced pressure of 75 mm was applied, after which distillation was carried out at 60° C. for two hours. After that time, the methyl ethyl ketone content was below 0.02% by weight.

The resulting solvent-free polyurethane dispersion was adjusted with deionized water and a further quantity of N,N-dimethylethanolamine to a solids content of 40% by weight, and a pH of 7.8 was established. The polyurethane present in the dispersion had a number-average molecular weight of 2508 daltons, a degree of branching of 0.12 mol/kg, an acid number of 43, and an equivalent weight, based on the blocked isocyanate groups, of 1090.

Preparation Example 2

Preparation of a Clearcoat Material of the Invention 83.25 parts by weight of the polyurethane dispersion from preparation example 1 were mixed with 2.65 parts by weight of trishydroxyethyl isocyanurate, 2 parts by weight of a 10% strength solution of an ethoxylated nonylphenol, 2 parts by weight of a 3% strength solution of a polyacrylic acid, and 10.1 parts by weight of deionized water and the mixture was homogenized by means of intensive stirring. The result was an aqueous, solvent-free clearcoat material having a solids content, or a nonvolatile constituents content, of 36% by weight.

Example

Production of a Multicoat System of the Invention

A customary and known aqueous silver metallic basecoat material was applied by pneumatic spraying to steel plates coated with a system which is customary for automotive finishing, comprising an electrodeposition coating material with a film thickness of 21 $\mu$m and an aqueous primer-surfacer with a film thickness of 35 $\mu$m, and the basecoat film was predried at 80° C. for 10 minutes to give a film thickness of 16 $\mu$m. The aqueous clearcoat material from preparation example 2 was then applied by pneumatic spraying and predried at 60° C. for 5 minutes. The predried coating films were then cured in a baking oven at a forced-air temperature of 155° C. for 20 minutes. The dry film thickness of the clearcoat was 42 $\mu$m.

This gave a smooth, glossy multicoat system which had no defects such as popping marks, streaks or cloudiness (haze), exhibited a high metallic effect, and was of pronounced resistance to chemicals, as underscored by customary and known test procedures such as those, for instance, which are well known to the skilled worker.

In the case of the MB gradient oven test, the test panels of example 1 were exposed under defined conditions to damage by sulfuric acid. For this purpose, dilute sulfuric acid, hydrochloric acid and sodium hydroxide solution were applied by pipette (25 $\mu$l per drop) at a distance of one segment width in each case (adjustment of the gradient to 30–74° C. [1° C. per heating segment]). Following storage under standard climatic conditions (23° C.) for 72 hours, the test panels were exposed for 30 minutes in a gradient oven (e.g. type 2615 from BYK-Gardner). The temperatures at which the first visible changes occurred were determined. In all cases, the temperatures were above 40° C.

What is claimed is:

1. A reactive polyurethane having a number average molecular weight Mn of from 800 to 14000 daltons, a degree of branching of from 0.0 to 3.0 mol/kg, and an isocyanate functionality from 2.0 to 6.0 per mole, comprising the reaction product of:

at least one polyester that has at least two isocyanate-reactive functional groups, a molecular mass of from 400 to 2500 daltons, and a degree of branching of from 0 to 3.5 mol/kg;

at least one of at least one polyol having a molecular mass of from 62 to 400 daltons and a functionality of from 2 to 4, at east one polyamine, and at least one alkanolamine, wherein at least one of the polyamine and the alkanolamine is present in the reaction product;

at least one compound comprising at least one functional group capable of forming anions and at least one isocyanate-reactive functional group;

at least one of at least one polyisocyanate and at least one polyisocyanate adduct;

at least one blocking agent for the isocyanate groups, wherein the blocking agent is eliminated at a sufficient reaction temperature from the isocyanate groups that are blocked by the blocking agent, or the blocking agent is released by a substitution reaction in the presence of a crosslinking agent; and at least one neutralizing agent for anionic stabilization in an aqueous medium comprising at least one of an organic base and an inorganic base;

wherein the reaction product does not contain a polyether.

2. The reactive polyurethane as claimed in claim 1, wherein the number average molecular weight Mn is from 1500 to 6000 daltons, the degree of branching is from. 0.1 to 1.0 mol/kg and the functionality is from 2.5 to 4.0 per mol., the isocyanate-reactive functional groups comprise OH groups, the polyesters have a molecular mass of from 800 to 1800 daltons, the functional groups that are capable of forming anions are at least one of a carboxylic acid group, a phosphonic acid group, and a sulfonic acid group, and the neutralizing agent comprises an organic base.

3. The reactive polyurethane as claimed in claim 1, wherein the blocking agent is used in a molar ratio of from 0.9 to 1.3, based on the isocyanate groups that are not reactable or reacted with the polyesters, the polyols, the polyamines, the alkanolamines, the compound comprising at least one functional group capable of forming anions and at least one isocyanate-reactive functional group, the polyisocyanates, and the polyisocyanate adducts, and the neutralizing agent is used in a molar ratio of from 0.5 to 1.2, based on the functional groups of the compounds that are capable of forming anions.

4. A polyurethane dispersion comprising at least one reactive polyurethane of claim 1 in a dispersion in an aqueous medium.

5. A method comprising preparing a solvent-free coating material, wherein the solvent-free coating material comprises the reactive polyurethane of claim 1.

6. A solvent-free coating material comprising at least one reactive polyurethane of claim 1.

7. The solvent-free coating material of claim 6 further comprising a crosslinking agent that is at least one of at least one polyol, at least one polyamine, and at least one alkanolamine.

8. The solvent-free coating material of claim 7, wherein at least one of the polyol, the polyamine, and the alkanolamine are not markedly volatile at room temperature and are also water-soluble or water-dilutable in conjunction with the reactive polyurethane.

9. The solvent-free coating material of claim 7, wherein at least one of the polyol, the polyamine, and the alkanolamine are used in an amount such that a ratio of (i) equivalent weight of the polyurethane, based on blocked isocyanate groups present therein, to (ii) equivalent weight of crosslinking agent is from 0.6 to 1.3.

10. The solvent-free coating material of claim 6 further comprising at least one coatings additive in an effective amount.

11. A method comprising applying the solvent-free coating material of claim 6 to a substrate to form an at least one coat coating system.

12. A process for producing an at least one coat coating system comprising applying at least one solvent-free coating material of claim 6 to a primed or unprimed substrate, and curing.

13. A process for producing a multicoat coating system on a primed or unprimed substrate comprising
(I) applying a basecoat material to the primed or unprimed substrate,
(II) applying a clearcoat material wet-on-wet to the basecoat, and
(III) curing the basecoat and clearcoat,
wherein at least one of the basecoat material and the clearcoat material comprise the solvent-free coating material of claim 6.

14. An at least one coat coating system comprising the solvent-free coating material of claim 6.

15. A substrate comprising the at least one coat coating system of claim 14.

16. A method comprising preparing a solvent-free coating material, wherein the solvent-free coating material comprises the polyurethane dispersion of claim 4.

17. A solvent-free coating material comprising at least one polyurethane dispersion of claim 4.

18. The solvent-free coating material of claim 17 further comprising a crosslinking agent that is at least one of at least one polyol, at least one polyamine, and at least one alkanolamine.

19. The solvent-free coating material of claim 18, wherein at least one of the polyol, the polyamine, and the alkanolamine are not markedly volatile at room temperature and are also water-soluble or water-dilutable in conjunction with the reactive polyurethane.

20. The solvent-free coating material of claim 18, wherein at least one of the polyol, the polyamine, and the alkanolamine are used in an amount such that a ratio of (i) equivalent weight of the polyurethane, based on blocked isocyanate groups present therein, to (ii) equivalent weight of crosslinking agent is from 0.6 to 1.3.

21. The solvent-free coating material of claim 17 further comprising at least one coatings additive in an effective amount.

22. A method comprising applying the solvent-free coating material of claim 17 to a substrate to form an at least one coat coating system.

23. A process for producing an at least one coat coating system comprising applying at least one solvent-free coating material of claim 17 to a primed or unprimed substrate, and curing.

24. A process for producing a multicoat coating system on a primed or unprimed substrate comprising
(I) applying a basecoat material to the primed or unprimed substrate,
(II) applying a clearcoat material wet-on-wet to the basecoat, and
(III) curing the basecoat and clearcoat,
wherein at least one of the basecoat material and the clearcoat material comprise the solvent-free coating material of claim 17.

25. An at least one coat coating system comprising the solvent-free coating material of claim 17.

26. A substrate comprising the at least one coat coating system of claim 25.

* * * * *